United States Patent [19]
Suttles

[11] Patent Number: 4,564,111
[45] Date of Patent: Jan. 14, 1986

[54] POST-PANEL CONNECTION FOR SHEET METAL FURNITURE

[75] Inventor: James M. Suttles, Elberton, Ga.

[73] Assignee: The Mead Corporation, Atlanta, Ga.

[21] Appl. No.: 566,657

[22] Filed: Dec. 29, 1983

[51] Int. Cl.⁴ ............................................. A47B 47/00
[52] U.S. Cl. ..................................... 211/189; 108/111
[58] Field of Search ................... 211/189, 90, 86, 183, 211/134; 108/111, 5; 248/243; 297/313; 312/313

[56] References Cited

U.S. PATENT DOCUMENTS

| | | | |
|---|---|---|---|
| 1,577,066 | 3/1926 | Medart | 248/243 X |
| 1,952,111 | 3/1934 | Bales | 108/111 X |
| 3,483,998 | 12/1969 | Butler | 211/189 |
| 3,999,875 | 12/1976 | Simon | 211/189 X |
| 4,034,683 | 7/1977 | DiCenzo | 108/111 |
| 4,148,263 | 4/1979 | Suttles | 108/1 |
| 4,379,431 | 4/1983 | Clement | 108/1 X |

FOREIGN PATENT DOCUMENTS

1048970  2/1979  Canada ................................ 211/189

*Primary Examiner*—Ramon S. Britts
*Assistant Examiner*—Sarah A. Lechok
*Attorney, Agent, or Firm*—Howson and Howson

[57] ABSTRACT

Sheet metal base panels in merchandising display stands are connected to sheet metal posts by the insertion of tabs into spaces between planar post sections and return flanges through slots. Projections on the tabs are engaged by oblique edges which exert a wedging action, tightening the engagement between the panels and the posts. In one version, the oblique edge is an edge of the return flange itself, and as the tab is inserted, it spreads the return flange away from the planar section of the post until the projection on the tab clears the oblique edge of the return flange, whereupon the flange snaps into place. A downward force exerted through the post by the weight of articles supported on the display stand effects a tightening action. In another version of the invention, a separate locking element having two wedges is vertically slidable in the post, and is moved into engagement with locking projections on tabs of the base panels of a merchandising unit. Each locking element has two wedges connected together by a bridge which has a projection extending away from the post for engagement by a tool or a shoe, by which the locking element can be urged downwardly.

13 Claims, 11 Drawing Figures

POST-PANEL CONNECTION FOR SHEET METAL FURNITURE

BRIEF SUMMARY OF THE INVENTION

This invention relates to sheet metal furniture such as merchandising display stands of the kind commonly used for displaying bottled soft drinks in supermarkets and convenience stores. The invention relates more particularly to an improved interconnection between the posts of a display stand and the sheet metal panels provided at the top and bottom thereof.

One form of display stand to which the invention is particularly applicable is the so-called "four-poster" display stand such as described in U.S. Pat. No. 4,148,263, dated Apr. 10, 1979. The four-poster stand comprises four sheet metal upright posts, one being located at each corner of the stand. The posts are interconnected at their upper ends by four header panels, and at their lower ends by four base panels. The header panels may carry identifying or advertising matter. The base panels extend downwardly from the lowermost shelf of the stand to the floor and prevent dirt and debris from accumulating underneath the stand. Sheet metal shelves are supported on the posts at selected levels, and the header panels, shelves and base panels cooperate with the posts to provide a rigid structure.

In U.S. Pat. No. 4,148,263, the panels and posts are interconnected by the engagement of specially designed projections on the panels with mating apertures on the posts. This arrangement eliminates the need for sheet metal screws, machine screws and similar fasteners. Numerous other fastener-free post and panel interconnections have been proposed. However, many of the presently available display stands still use screw fasteners. This may be due to a number of factors, such as difficulty in assembly of available fastener-free display stands, lack of stability, or the need for heavy-gauge sheet metal parts to insure stability.

The principal object of this invention is to provide a fastener-free sheet metal display stand which is readily assembled by unskilled persons, and which is very stable yet light in weight.

In accordance with the invention, a panel is provided with tabs having projections which are engageable by oblique surfaces associated with a post. Each post has a first planar section, and a return flange extending substantially parallel to the planar section in spaced relationship therewith to provide a tab-receiving space. The tab extends through an opening in the web connecting the return flange to the planar section.

In one version of the invention, the oblique surface which engages the projection of the tab is formed on the return flange itself. The return flange is urged toward the planar section of the post by a spring action. As the tab is pushed through the opening of the web of the post, the spring action causes the return flange to lock the tab in place as soon as its projection clears the oblique edge of the return flange. The weight of the posts, and the articles supported thereon exerts a tightening action on the interconnection between the posts and the base panels. A small clearance is provided between the posts and the floor to allow this tightening action to occur. This version of the invention is primarily useful for interconnecting base panels with upright posts.

In a second version of the invention, a locking member is vertically slidable in the post, but trapped therein and prevented from removal from the post horizontally. The locking member has wedge-shaped sections with oblique surfaces for engaging the projections on the panel tabs. Preferably, a single locking member is provided with two such wedge-shaped sections so that it serves both panels connected to a single post. The two wedge-shaped sections are connected by a bridge which projects away from the adjacent part of the post so that it can be forced downwardly by stepping on it or by striking it with a hammer or similar tool.

Various further objects and advantages of the invention will be apparent from the following detailed description when read in conjunction with the drawings.

DETAILED DESCRIPTION

Figure 1:
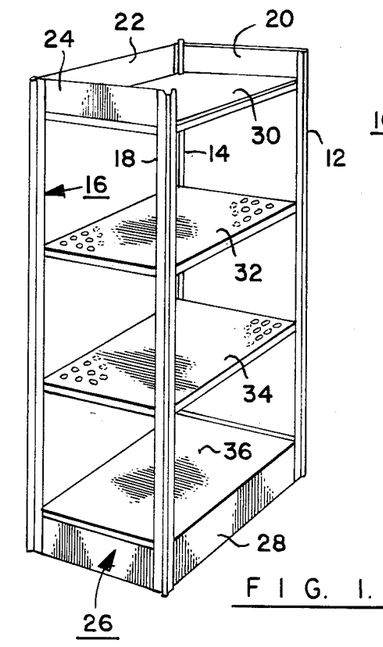
FIG. 1 is a perspective of a typical merchandising display stand.

The overall merchandising display stand, as shown in FIG. 1, comprises a set of four upright sheet metal corner posts 12, 14, 16 and 18. Header panels are connected between the posts at their upper ends. Header panel 20 is connected between posts 12 and 14. Header panel 22 is connected between posts 14 and 16, and header panel 24 is connected between posts 16 and 18. Base panels are shown at 26 and 28, base panel 26 being connected between posts 16 and 18, and base panel 28 being connected between posts 18 and 12. Rectangular shelves are provided at 30, 32, 34 and 36. The absence of a header panel between posts 12 and 18 permits access to uppermost shelf 30. Lowermost shelf 36 is flush with the upper edges of the base panels.

Figure 2:
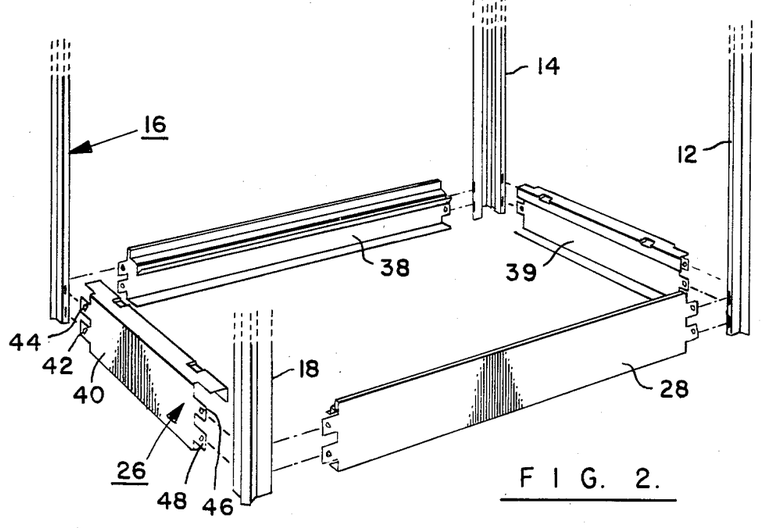
FIG. 2 is an exploded perspective of the base of a display stand in accordance with the invention showing the posts and base panels.

As shown in FIG. 2, the base also includes rear panel 38 and side panel 39, not seen in FIG. 1. The base panels are sheet metal panels having substantially vertical sheet metal faces with reinforcing flanges at their upper and lower edges. Tabs extend outwardly from the side edges of the panel faces. Preferably, although not necessarily, these tabs are situated in the plane of the panel face. As shown in FIG. 2, panel 26 has a vertical planar face 40 with tabs 42 and 44 at one edge, and tabs 46 and 48 at its other edge. Tabs 42 and 44 cooperate with slots in post 16 for connection of the panel to the post. Similarly, tabs 46 and 48 cooperate with slots in post 18.

Figure 3:
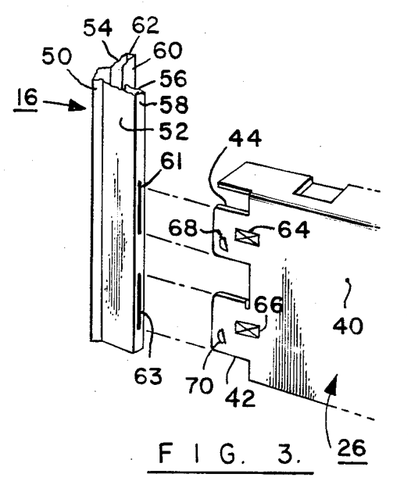
FIG. 3 is a fragmentary exploded view showing how the tabs of a base panel cooperate with openings in a web of an upright post.

As shown in FIG. 3, post 16 comprises a U-shaped channel 50 having planar sections 52 and 54 extending outwardly from the channel legs in vertical planes. Sections 52 and 54 are perpendicular to each other, and situated at 135 degree angles with respect to the legs of channel 50.

Section 52 of post 16 has a return flange 56 extending substantially parallel to it and connected to it by a web 58. Similarly, section 54 has a return flange 60 connected to it by a web 62.

Preferably, the channel, planar sections, webs and return flanges of the post are unitary, being formed from a single sheet of metal. At least at the lower end of the post, the return flange is very close to its corresponding planar section so that it is spread away from the planar section when the tabs of a panel are inserted into the space between them. Slots are provided at 61 and 63 in web 58 for this purpose.

Depressions are formed at 64 and 66 in the face of panel 26 at the locations where the tabs meet the face of the panel. These depressions extend partly into the tabs themselves, and appear as bumps or projections on the inside face of the panel. They cooperate with the slots to prevent the panel from moving from side to side in the slots. The tabs are also provided with depressions 68 and 70 near their outer ends. These depressions are D-shaped, and appear as D-shaped projections on the inside faces of the tabs. The D-shaped projections have oblique, upwardly and outwardly facing, straight surfaces which cooperate with oblique locking surfaces on return flange 56, as appears more clearly in FIG. 4, where post 16 and panel 26 are shown connected to each other.

Figure 4:
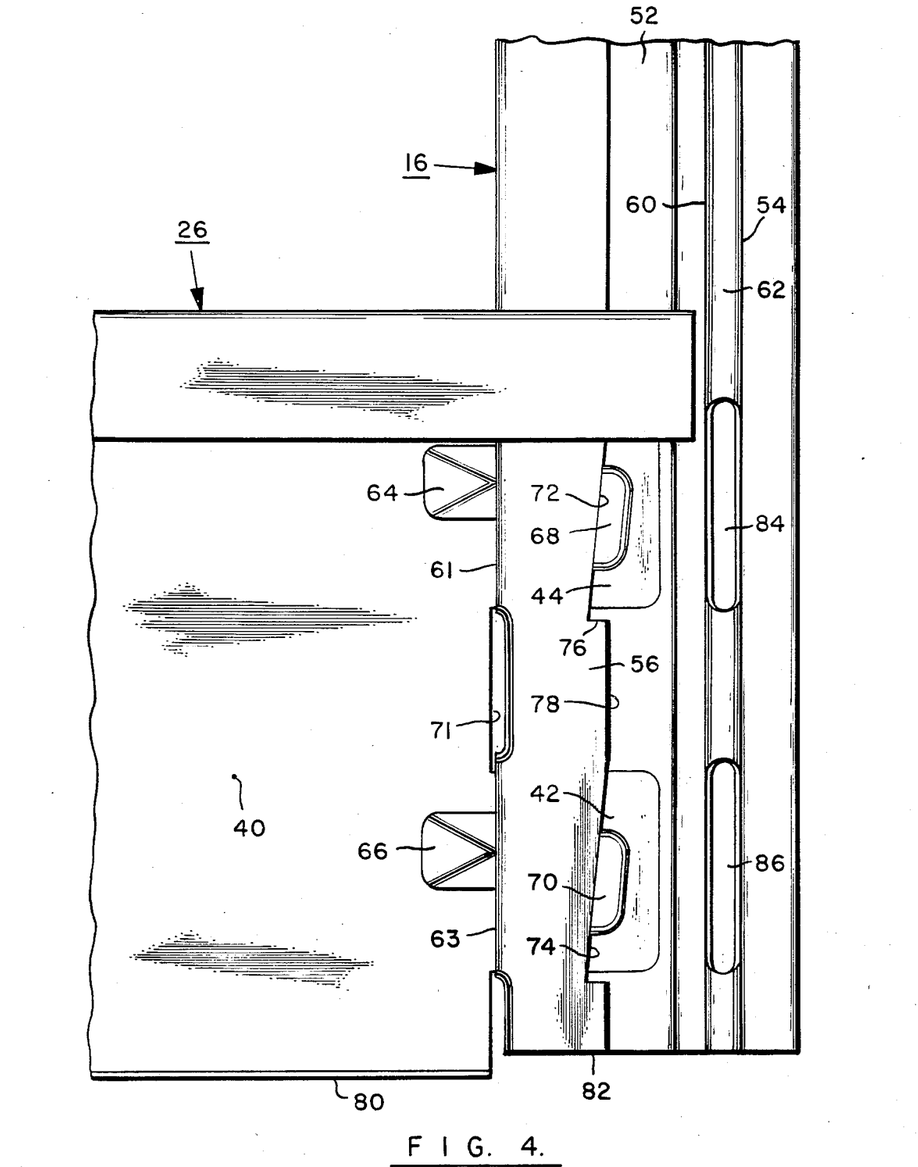
FIG. 4 is an elevational view from the inside of a corner of the display stand base, showing how the projections of the tabs of a panel are engaged by oblique surfaces on the edge of a return flange of a post.

As shown in FIG. 4, tabs 42 and 44 of panel 26 extend respectively through slots 63 and 61 and into the space between post section 52 and its return flange 56. Movement of the tabs into the slots is limited by engagement of the edge 71 of panel 40 with web 62 at the ends of slots 61 and 63. D-shaped projections 68 and 70 are engaged with downwardly and inwardly facing oblique edges 72 and 74 respectively of return flange 56. These oblique edges are vertically aligned with each other, there being a step 76 and a vertical part 78 of the edge of the return flange between the oblique parts 72 and 74. Projections at 64 and 66 engage the near edge of slots 61 and 63, as seen in FIG. 4, while the sides of the tabs opposite the side seen in FIG. 4 engage the opposite vertical edges of the slots. This prevents the tabs from moving from side to side in the slots when the post and panel are locked together. Flange 80 at the bottom of panel 26 rests on a floor, while the lower end 82 of post 16 is spaced a short distance from the floor. The weight on the post urges oblique surfaces 72 and 74 tightly against projections 68 and 70 to insure a secure connection between the panel and post.

The panel and post are connected together by pushing the tabs into the slots of the post. The rounded sides of the D-shaped projections exert a camming action against return flange 56, causing it to spread away from planar section 52 of the post until the projections clear edges 72 and 74. The spring action of the web and return flange causes the return flange to snap into place into the position shown in FIG. 4. Panel 38 (FIG. 2) is snapped into slots 84 and 86 (FIG. 4) in a similar manner. The edges of projections 68 and 70 which engage oblique edges 72 and 74 of return flange 56 preferably lie in a plane perpendicular to the flange so that they do not cam the flange edge away from planar section 52.

While it is desirable to use two tabs on each end of a panel in cooperation with two slots in the post in order to achieve an extremely rigid connection, many of the advantages of the invention, particularly simplicity of construction and ease of assembly, can be achieved using a single tab and a single slot.

Figure 5:
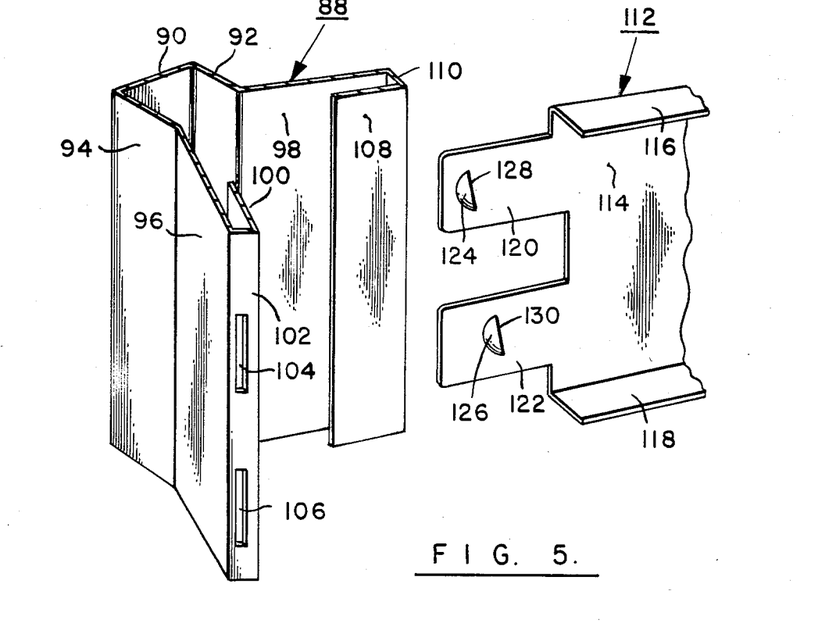
FIG. 5 is an exploded view of a post and panel in accordance with a second version of the invention.
Figure 6:
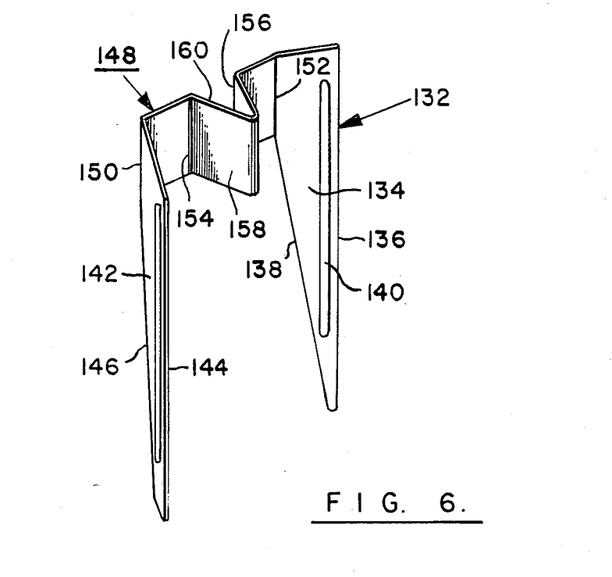
FIG. 6 is a perspective view of a locking member for use with the post and panel of FIG. 5.

In accordance with a second version of the invention, as shown in FIGS. 5 and 6, a sheet metal post 88 comprises a U-shaped channel 90 having legs 92 and 94. Extending from the legs of the channel are planar post sections 96 and 98. These sections are symmetrical with respect to the channel, and perpendicular to each other. A return flange 100 extends parallel to planar section 96, and is spaced therefrom to provide a tab-receiving space. The flange is connected to section 96 by a sheet metal web 102, having tab-receiving slots 104 and 106. A similar return flange 108 is connected to planar section 98 by web 110, which also has tab-receiving slots (not shown in FIG. 5). Base panel 112 comprises a face section 114 situated in a vertical plane, and upper and lower horizontal flanges 116 and 118. Tabs 120 and 122 extend in the plane of panel face 114 from one edge thereof, and have D-shaped struck-out projections 124 and 126. These projections are formed in such a way that they have edges 128 and 130 respectively. These edges lie in oblique planes, and, as is the case in FIG. 5, they may lie in the same plane.

FIG. 6 shows a locking element 132 which is slidable in post 88 of FIG. 5. Locking element 132 is a unitary sheet metal element having a pair of wedges connected by a bridge. Wedge 134 has a straight vertical edge 136. At least its lower part is downwardly tapered and therefore, it has an opposite oblique edge 138 for engaging edges 128 and 130 (FIG. 5) of the projections on the tabs of the panel. A rib is formed at 140. This rib serves not only as a reinforcement, but also as a positioner, as will be seen from FIG. 8.

Wedge 142 is similar to wedge 134. It has a straight vertical edge 144, and an oblique edge 146. The upper ends of the wedges are connected by a bridge 148 which meets the upper ends of the wedges at vertical bend lines 150 and 152. The bridge itself is bent along vertical lines at 154 and 156 to provide a V-shaped projection 158, which extends symmetrically between the wedges and provides a V-shaped upper edge 160 which can be engaged by external means for urging the locking element downwardly so that its wedges are forced into tight engagement with the projections of the tabs. The external means could be a hammer or similar tool, or the heel of a shoe. Wedges 134 and 142 lie in vertical planes which are substantially perpendicular to each other. Therefore, these wedges can fit into the spaces between the planar sections 96 and 98 of the post and their return flanges 100 and 108.

Figure 7:
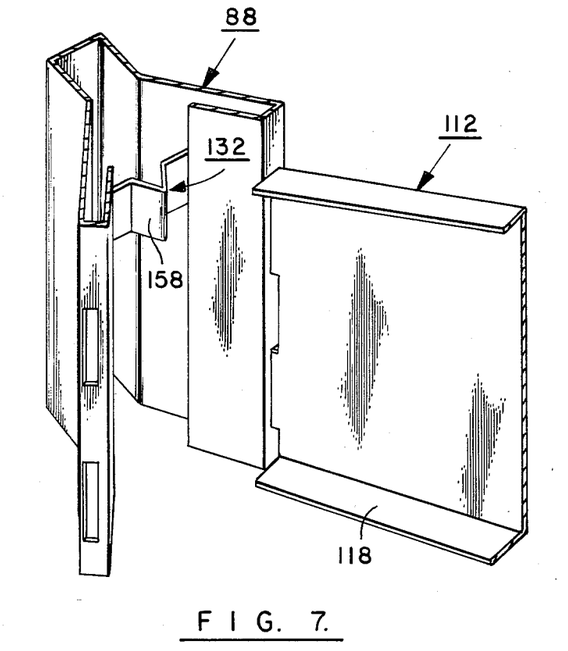
FIG. 7 is a perspective view showing the post and panel of FIG. 5 held together by the locking member of FIG. 6.
Figure 8:
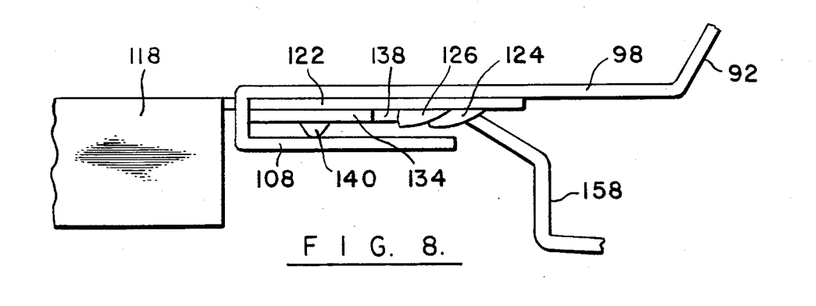
FIG. 8 is a fragmentary bottom plan view of the assembly of FIG. 7.

In assembly of the elements of FIGS. 5 and 6, the locking element is inserted into the upper or lower end of the post and positioned so that it is located above the tab-receiving slots. The tabs of panel 112 are inserted into the slots of web 110, and a similar pair of tabs of a second panel (not shown) are inserted into the slots of web 102. The locking element is then moved downwardly into the position shown in FIG. 7, and projection 158 is forcibly moved downwardly to tighten engagement between the wedges and the projections of the tabs on the panels. As shown in FIG. 8, projections 126 and 124 are engaged by edge 138 of wedge 134. Rib 140 of wedge 134 engages the inside of return flange 108, and holds the wedge against the tabs, so that the tabs are held tightly against planar post section 98. Thus, the rib prevents the tabs of the panel from moving sideways in the slots of the post even though the slots are large enough to receive the tabs with their projections 124 and 126. Tightening projections corresponding to projections 64 and 66 in FIG. 4 are unnecessary in the arrangement shown in FIGS. 5–8.

Figure 9:
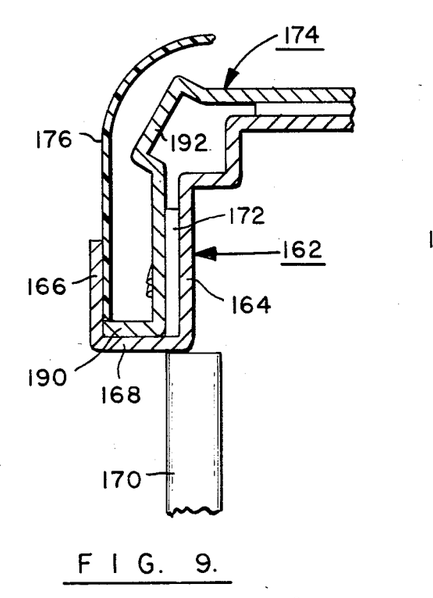
FIG. 9 is a horizontal section through a post and panel connection in accordance with a third version of the invention.
Figure 10:
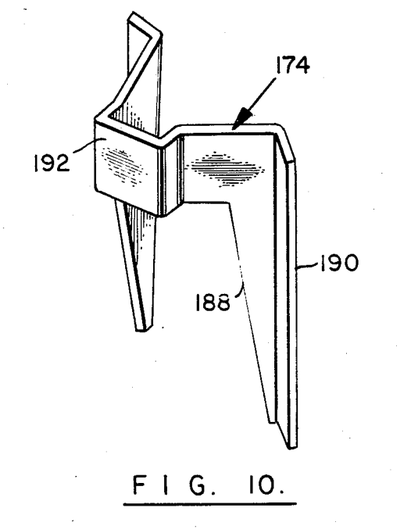
FIG. 10 is a perspective view of the locking member in FIG. 9.
Figure 11:
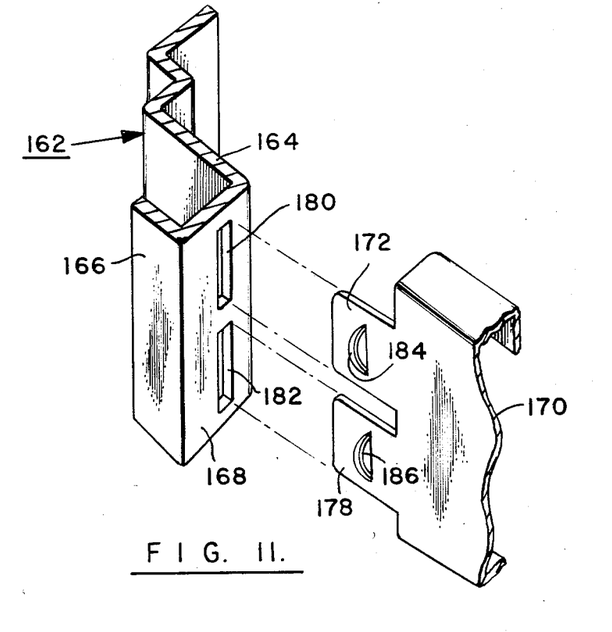
FIG. 11 is a fragmentary exploded view of the post and panel of FIG. 9.

A third version of the invention is illustrated in FIGS. 9–11, in which post 162 has outwardly projecting flanges for receiving flexible plastic trim.

As shown in FIG. 11, post 162 comprises a planar section 164 and a return flange 166 connected to the planar section by a slotted web 168. A similar return flange and slotted web (not shown) are provided at the opposite edge of the post. Panel 170 is similar to the panel in FIG. 5. It comprises upper and lower tabs 172 and 178 having D-shaped projections 184 and 186 respectively. As shown in FIG. 9, the tabs extend into the space between planar section 164 and return flange 166, and lie against the inner face of planar section 164. Tab 172 is visible in FIG. 9. The tabs are held against the inner face of the planar section by locking element 174. Plastic rim is provided at 176, and is held in place by the return flanges.

Tabs 172 and 178 extend respectively into slots 180 and 182 of web 168, as shown in FIG. 11, and the locking element 174 (FIG. 10) has an oblique edge 188 which engages the co-planar edges of projections 184 and 186, causing tightening of the engagement between the panel and the post as the locking element is urged downwardly. Flange 190 of the locking element, as shown in FIG. 9, engages return flange 166, thereby insuring that the tabs are held against the inner face of planar post section 164. Here again, because of flange 190, the slots can be wide enough to receive the tabs and their projections, yet the tabs cannot move sideways in the slots after the locking element is placed in locking position. The locking element is urged downwardly by engagement of a suitable tool or a shoe with projection 192 formed in its bridge.

The arrangement of FIGS. 9–11 is very similar to that of FIGS. 5–8, except that, in FIGS. 9–11, the return flanges of the post are positioned toward the outside, whereas in FIGS. 5–8, the return flanges are positioned toward the inside.

The second and third versions of the invention, as illustrated in FIGS. 5–11 inclusive can be used not only to connect base panels with posts, but, can also be used to connect header panels to a post, as these versions of the invention do not rely on a downward force exerted through the posts for a tightening effect, as is the case in FIGS. 1–4.

Numerous modifications can be made to the invention. For example, the projections on the tabs in the first version of the invention as shown in FIG. 4 need not be vertically aligned with each other. Likewise, the projections in FIGS. 5 and 11 need not have co-planar wedge-engageable edges, if other suitable wedge configurations are provided. It is of course, necessary to insure that the lower part of the wedge clears the projection on the upper tab as the wedge is lowered into place. A panel edge can have one tab, two tabs, or any desired number of tabs. Two tabs per panel edge are preferred as the simplest way of obtaining a strong and rigid connection between a panel and a post.

Various modifications other than those specifically mentioned can be made to the invention as described herein without departing from its scope as defined in the following claims.

I claim:

1. In an article of sheet metal furniture such as a merchandising display stand, comprising a sheet metal upright post and at least one panel having a face situated in a substantially vertical plane and extending horizontally from the post, the improved structure wherein:

the sheet metal upright post comprises a first planar section and a return flange extending substantially parallel to the first planar section in spaced relationship therewith to provide a space between the first planar section and the flange, a web connecting the return flange to the first planar section, the web having at least one opening for receiving a tab;

the panel has at least one tab extending in a horizontal direction from its face, the face of the panel being positioned outside of the space between the first planar section and the flange, and said tab extending through the tab-receiving opening into the space between the first planar section and a flange, and a projection formed on said tab and extending horizontally from the tab in a direction transverse to said horizontal direction in which the tab extends from the face of the panel; and the sheet metal upright post includes means having an oblique locking surface facing both downwardly and, in said direction of the tab, away from the location at which the tab meets the face of the panel, the oblique locking surface being in engagement with the projection on the tab and preventing the tab from being withdrawn through the opening in the web.

2. A structure according to claim 1 in which the oblique locking surface is formed on an edge of the return flange.

3. A structure according to claim 1 in which the oblique locking surface is formed on an edge of a sheet metal slide located at least in part within the space between the first planar section and the flange and vertically slidable therein.

4. A structure according to claim 3 in which the post includes means for preventing the slide from disengaging horizontally from the post.

5. In an article of sheet metal furniture, such as a merchandising display stand, comprising a sheet metal upright post and at least one panel having a face situated in a substantially vertical plane and extending horizontally from the post, the improved structure wherein:

the sheet metal upright post comprises a first planar section and a return flange extending substantially parallel to the first planar section in spaced relationship therewith to provide a space between the first planar section and the flange, a web connecting the return flange to the first planar section, the web having at least one opening for receiving a tab, and the return flange having an edge remote from the web, said edge having at least one oblique section facing downwardly and away from the web;

the panel being positioned outside of the space between the first planar section and the flange, and having at least one tab extending from the face of the panel in a horizontal direction parallel to said first planar section and said return flange, through the tab-receiving opening, through said space between the first planar section and the flange, and past the oblique section of said edge of the flange, and a projection formed on said tab, the projection having a locking surface engaged with the oblique section of said edge of the flange, means on the panel for engaging a floor, and means on the panel for engaging the post and thereby limiting movement of the tab into the space between the first planar section of the post and the flange;

the projection and limiting means are spaced from each other by a distance such that, as the post moves downwardly, the oblique edge of the flange tightly engages the locking surface of the projection before the lower end of the post reaches the level of the floor-engaging means of the panel; and said locking surface extends from the tab at an angle such that camming of the flange edge away from the first planar section of the post as a result of said tight engagement is avoided.

6. A structure according to claim 5 in which the return flange has a spring characteristic urging its edge remote from the web toward the first planar section of the post.

7. A structure according to claim 5 in which the return flange has a spring characteristic urging its edge remote from the web toward the first planar section of the post, in which the opening in the web is of a size such that the combination of the tab and projection can move freely through said opening into the space between the flange and the first planar section of the post.

8. A structure according to claim 5 in which the return flange has a spring characteristic urging its edge remote from the web toward the first planar section of the post, in which the opening in the web is of a size such that the combination of the tab and projection can move freely through said opening into the space between the flange and the first planar section of the post, and in which the space between the oblique section of the edge of the flange and the first planar section of the post is less than the thickness of the combination of the tab and projection when the return flange is relaxed.

9. A structure according to claim 5 in which the return flange has a spring characteristic urging its edge remote from the web toward the first planar section of the post, in which the opening in the web is of a size such that the combination of the tab and projection can move freely through said opening into the space between the flange and the first planar section of the post, in which the space between the oblique section of the edge of the flange and the first planar section of the post is less than the thickness of the combination of the tab and projection when the return flange is relaxed, and in which the projection comprises a camming surface positioned toward the end of the tab which first enters the opening in the web, the camming surface serving to spread the return flange away from the first planar section of the post until the locking surface of the projection clears the edge of the flange.

10. A structure according to claim 5 in which the opening in the web is of a size such that the combination of the tab and projection can move freely through the opening into the space between the flange and the first planar section of the post, and having an additional projection at least partly on the tab and extending outwardly therefrom at a location such that, when the locking surface is in engagement with the oblique section of the edge of the return flange, the additional projection engages a side of the web opening and prevents side-to-side movement of the tab in said opening.

11. In an article of sheet metal furniture such as a merchandising display stand, comprising a sheet metal upright post and first and second panels having faces situated respectively in substantially vertical intersecting planes and extending horizontally from the post, the improved structure wherein:

the sheet metal upright post comprises first and second planar sections situated respectively in intersecting vertical planes, a first flange extending substantially parallel to the first planar section in spaced relationship therewith to provide a first space between the first planar section and the first flange, a first web connecting the first return flange to the first planar section, the first web having at least one opening for receiving a tab, a second flange extending substantially parallel to the second planar section in spaced relationship therewith to provide a second space between the second planar section and the second flange, and a second web connecting the second return flange to the second planar section, the second web also having at least one opening for receiving a tab;

the first panel has a first tab extending in a horizontal direction from its face, the face of said first panel being positioned outside said first space and the first tab extending through the tab-receiving opening of the first web into said first space, and a projection formed on said first tab and located within said first space;

the second panel has a second tab extending in a horizontal direction from its face, the face of said second panel being positioned outside of said second space and the second tab extending through the tab-receiving opening of the second web into said second space, and a projection formed on said second tab and located within said second space;

the structure includes a locking element having a first wedge located within said first space and a second wedge located within said second space, the first and second wedges being connected to each other by a bridge, and the locking element is vertically slidable in the upright post but prevented by the planar sections and flanges from being disengaged from the post by movement in a horizontal direction;

the first wedge has an oblique edge engaged with the projection on the first tab and preventing the first tab from being withdrawn from the opening of the first web; and the second wedge has an oblique edge engaged with the projection of the second tab and preventing the second tab from being withdrawn from the opening of the second web.

12. A structure according to claim 11 in which the bridge includes a section projecting away from the adjacent part of the post whereby said section can be engaged by external means for urging the locking element vertically so that its wedges are forced into tight engagement with said projections of the tabs.

13. A structure according to claim 11 in which the locking element is a unitary sheet metal element, all parts of which are substantially in vertical planes, and in which at least part of the bridge of the locking element is bent along vertical lines to provide a section projecting away from the adjacent part of the post whereby said section can be engaged by external means for urging the locking element verticallly so that its wedges are forced into tight engagement with said projections of the tabs.

* * * * *

UNITED STATES PATENT AND TRADEMARK OFFICE
CERTIFICATE OF CORRECTION

PATENT NO. : 4,564,111
DATED : January 14, 1986
INVENTOR(S) : James M. Suttles

It is certified that error appears in the above-identified patent and that said Letters Patent are hereby corrected as shown below:

Column 5, line 27, "rim" should be --trim--.

Column 6, line 25, "a" before "flange" should be --the--.

Signed and Sealed this

Thirteenth Day of May 1986

[SEAL]

Attest:

DONALD J. QUIGG

Attesting Officer

Commissioner of Patents and Trademarks